United States Patent
Spear et al.

(10) Patent No.: US 11,379,427 B2
(45) Date of Patent: Jul. 5, 2022

(54) AUXILARY LRU LIST TO IMPROVE ASYNCHRONOUS DATA REPLICATION PERFORMANCE

(71) Applicant: International Business Machines Corporation, Armonk, NY (US)

(72) Inventors: Gail Spear, Tucson, AZ (US); Lokesh M. Gupta, Tucson, AZ (US); Kyler A. Anderson, Sahuarita, AZ (US); David B. Schreiber, Tucson, AZ (US); Kevin J. Ash, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/804,308

(22) Filed: Feb. 28, 2020

(65) Prior Publication Data

US 2021/0271641 A1 Sep. 2, 2021

(51) Int. Cl.
*G06F 16/178* (2019.01)
*G06F 16/172* (2019.01)

(52) U.S. Cl.
CPC .......... *G06F 16/178* (2019.01); *G06F 16/172* (2019.01)

(58) Field of Classification Search
CPC ........... G06F 2201/855; G06F 11/2056; G06F 11/2082; G06F 11/1446; G06F 11/1402; G06F 11/2074; G06F 16/273; G06F 12/12; G06F 12/0804; G06F 16/172; G06F 12/0866; G06F 12/0868; G06F 12/0871; G06F 11/2064; G06F 11/2066; G06F 11/2071; G06F 11/2076; G06F 11/2079; G06F 16/27; G06F 16/275; G06F 16/278; G06F 16/178; G06F 16/1787; H04L 29/0854; H04L 67/2842

See application file for complete search history.

(56) References Cited

U.S. PATENT DOCUMENTS

| | | | |
|---|---|---|---|
| 10,235,054 B1* | 3/2019 | Clark | G06F 12/0897 |
| 2004/0181632 A1* | 9/2004 | Factor | G06F 11/2074 |
| | | | 711/133 |
| 2006/0080510 A1* | 4/2006 | Benhase | G06F 12/123 |
| | | | 711/136 |
| 2006/0143399 A1* | 6/2006 | Petev | G06F 12/123 |
| | | | 711/136 |
| 2007/0185938 A1* | 8/2007 | Prahlad | G06F 16/184 |

(Continued)

*Primary Examiner* — David T. Brooks
(74) *Attorney, Agent, or Firm* — Nelson IP; Daniel P. Nelson

(57) ABSTRACT

A method for improving asynchronous data replication between a primary storage system and a secondary storage system is disclosed. In one embodiment, such a method includes monitoring, in a cache of the primary storage system, unmirrored data elements needing to be mirrored, but that have not yet been mirrored, from the primary storage system to the secondary storage system. The method maintains a regular LRU list designating an order in which data elements are demoted from the cache. The method determines whether a data element at an LRU end of the regular LRU list is an unmirrored data element. In the event the data element at the LRU end of the regular LRU list is an unmirrored data element, the method moves the data element to a transfer-pending LRU list dedicated to unmirrored data elements in the cache. A corresponding system and computer program product are also disclosed.

20 Claims, 14 Drawing Sheets

(56) References Cited

U.S. PATENT DOCUMENTS

| | | |
|---|---|---|
| 2012/0324171 A1 | 12/2012 | Benhase et al. |
| 2013/0185493 A1* | 7/2013 | Benhase ............... G06F 12/128 |
| | | 711/105 |
| 2014/0279854 A1* | 9/2014 | Scanlon ................ G06F 16/162 |
| | | 707/609 |
| 2016/0283130 A1 | 9/2016 | Gupta et al. |
| 2019/0042096 A1* | 2/2019 | Anderson ............. G06F 3/0617 |
| 2019/0057037 A1 | 2/2019 | Anderson et al. |

* cited by examiner

AUXILARY LRU LIST TO IMPROVE ASYNCHRONOUS DATA REPLICATION PERFORMANCE

BACKGROUND

Field of the Invention

This invention relates to systems and methods for improving transfer performance in asynchronous data replication environments.

Background of the Invention

In asynchronous data replication environments such as z/OS Global Mirror (also referred to as "XRC") and Global Mirror, data is asynchronously mirrored from a primary storage system to a secondary storage system to maintain two consistent copies of the data. The primary and secondary storage systems may be located at different sites, perhaps hundreds or even thousands of miles away from one another. In the event an outage occurs at the primary storage system, host I/O may be redirected to the secondary storage system, thereby enabling continuous operations. When the outage is corrected or repaired at the primary storage system, host I/O may be redirected back to the primary storage system.

In asynchronous data replication environments such as XRC, updated data elements (e.g., tracks) are written to cache of the primary storage system. The updated data elements are recorded in an out-of-sync bitmap (i.e., OOS) to indicate that they need to be mirrored to the secondary storage system. Data elements that are written to the primary cache may be destaged to backend storage drives residing on the primary storage system, and eventually demoted. The destage and demotion processes are independent from the asynchronous mirroring process.

In certain cases, the primary storage system may destage and demote a data element before the asynchronous mirroring takes place. In such cases, the data element may need to be re-staged to the primary cache so it can then be mirrored to the secondary storage system. In other cases, the data element may be asynchronously mirrored to the secondary storage system before the data element is destaged and demoted from the primary cache. This scenario is preferred, since it only requires mirroring modified portions (e.g., sectors) of the updated data element to the secondary storage system, whereas a scenario that re-stages the data element to the primary cache not only requires moving the data element from the backend storage drives to the primary cache, but also requires mirroring the entire data element (e.g., track) to the secondary storage system. Thus, re-staging and mirroring an unmirrored data element may be significantly less efficient than mirroring the data element prior to its destage and/or demotion.

SUMMARY

The invention has been developed in response to the present state of the art and, in particular, in response to the problems and needs in the art that have not yet been fully solved by currently available systems and methods. Accordingly, the invention has been developed to improve asynchronous data replication between a primary storage system and a secondary storage system. The features and advantages of the invention will become more fully apparent from the following description and appended claims, or may be learned by practice of the invention as set forth hereinafter.

Consistent with the foregoing, a method for improving asynchronous data replication between a primary storage system and a secondary storage system is disclosed. In one embodiment, such a method includes monitoring, in a cache of the primary storage system, unmirrored data elements needing to be mirrored, but that have not yet been mirrored, from the primary storage system to the secondary storage system. The method maintains a regular LRU list designating an order in which data elements are demoted from the cache. The method determines whether a data element at an LRU end of the regular LRU list is an unmirrored data element. In the event the data element at the LRU end of the regular LRU list is an unmirrored data element, the method moves the data element to a transfer-pending LRU list dedicated to unmirrored data elements in the cache.

A corresponding computer program product and system are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
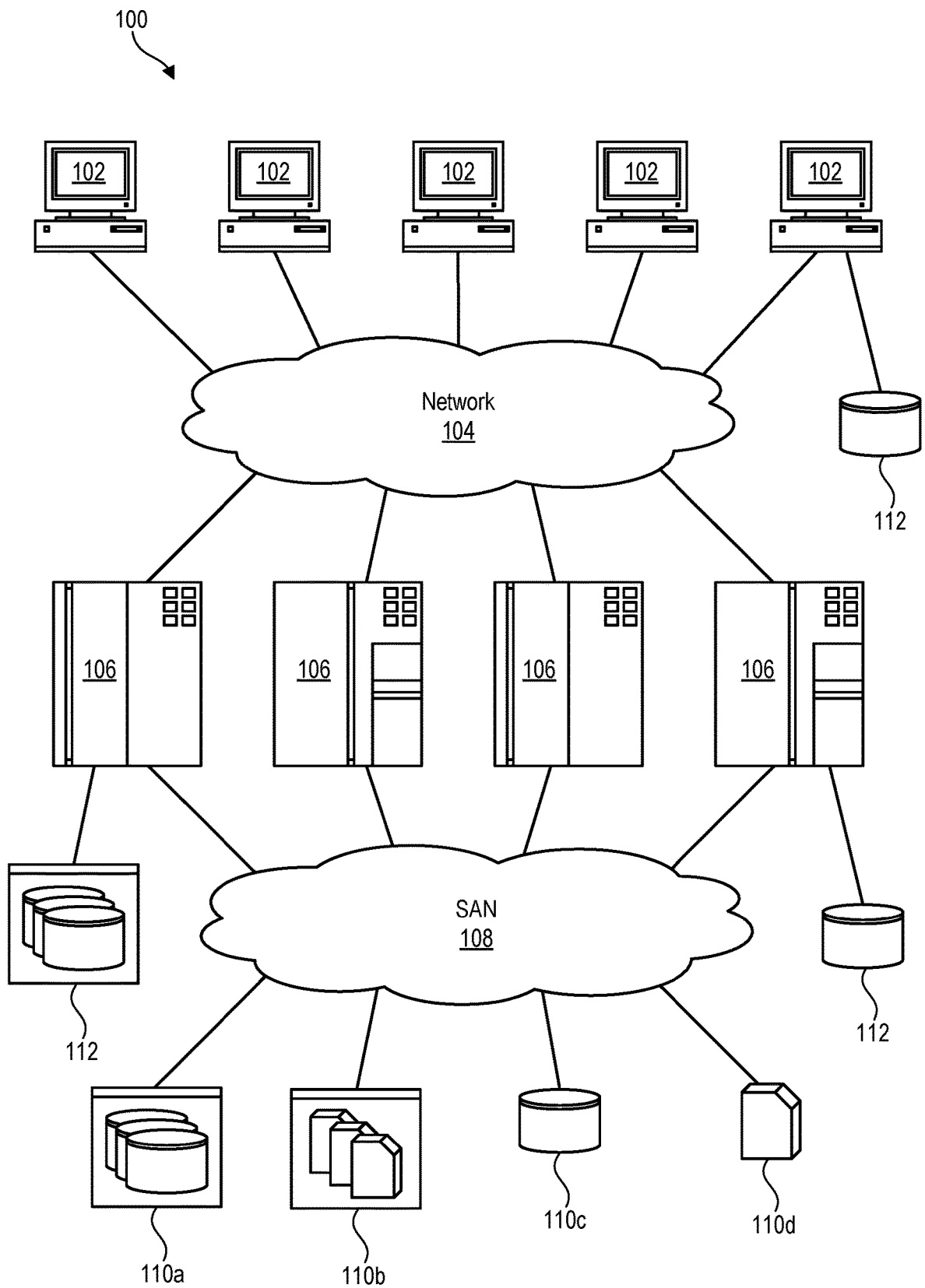
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer-implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where embodiments of the invention may operate. The network environment 100 is presented only by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

Figure 2:
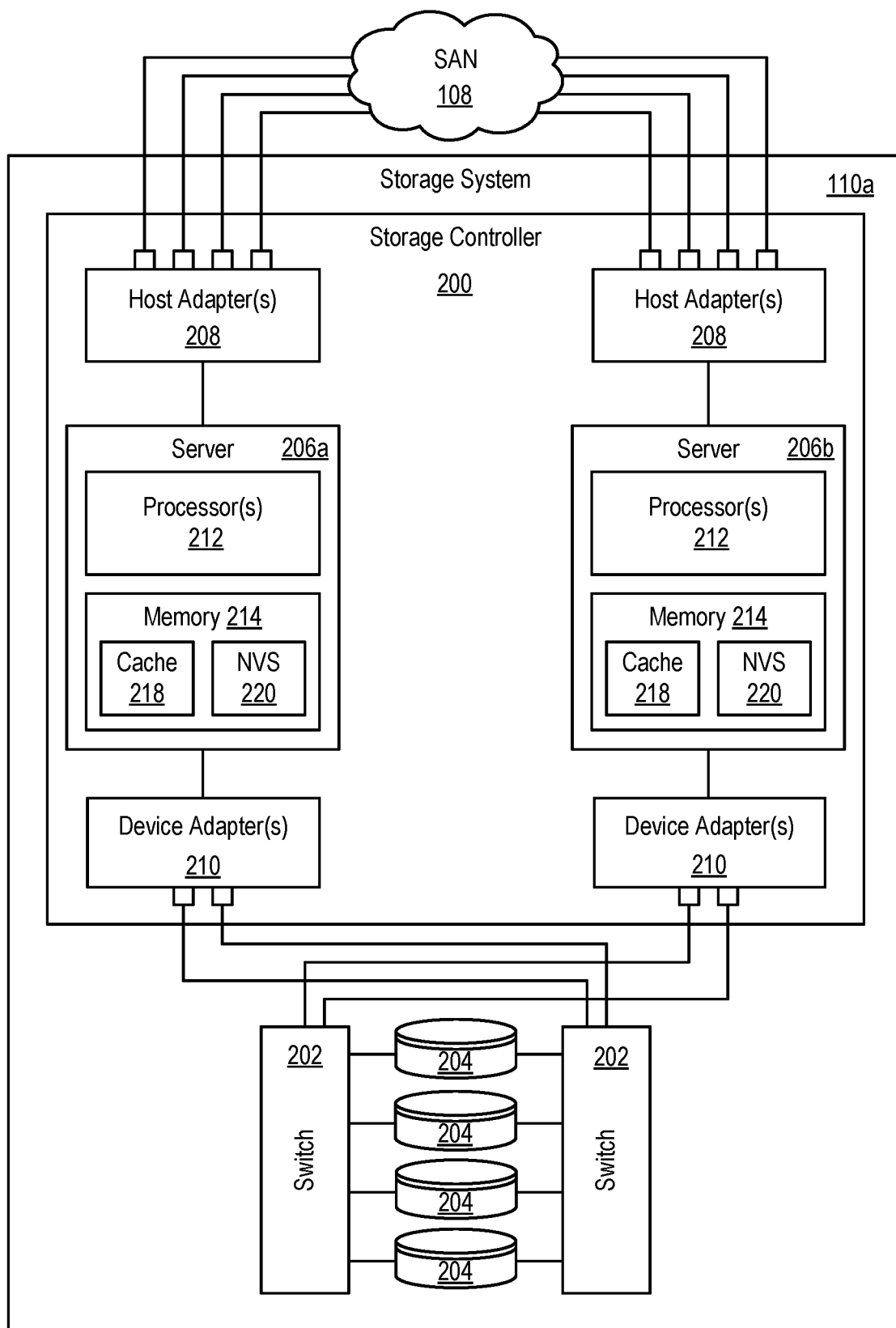
FIG. 2 is a high-level block diagram showing one example of a storage system for use in the network environment of FIG. 1.
Figure 3:
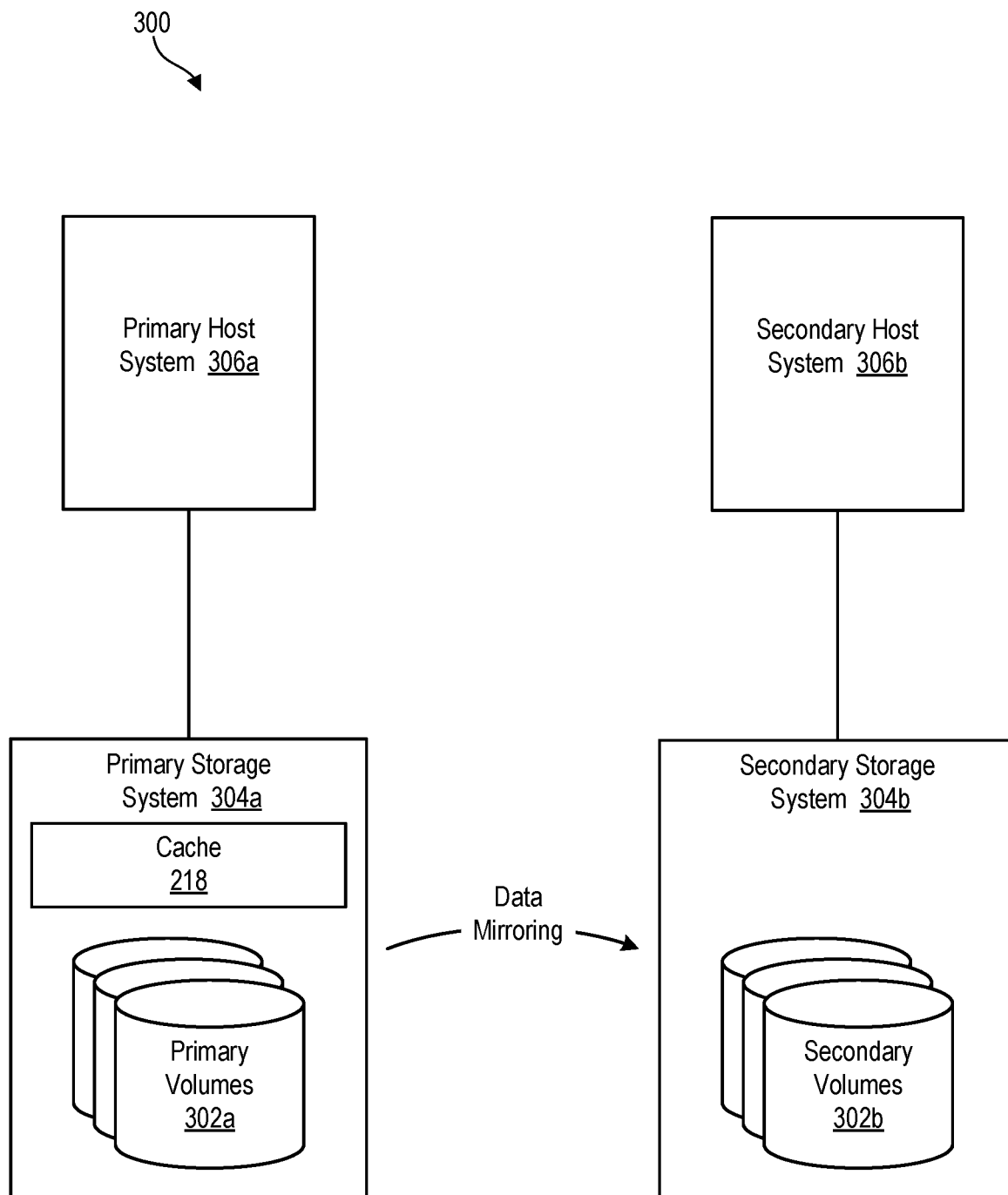
FIG. 3 is a high-level block diagram showing an example of an asynchronous data replication environment.

Referring to FIG. 2, one embodiment of a storage system 110a containing an array of storage drives 204 (e.g., hard-disk drives and/or solid-state drives) is illustrated. As shown, the storage system 110a includes a storage controller 200, one or more switches 202, and one or more storage drives 204 such as hard disk drives and/or solid-state drives (such as flash-memory-based drives). The storage controller 200 may enable one or more hosts 106 (e.g., open system and/or mainframe servers 106) to access data in the one or more storage drives 204. The storage drives 204 may, in certain embodiments, be configured in RAID arrays of various RAID levels to provide desired levels of I/O performance and/or data redundancy. Logical volumes 302 (as shown in FIG. 3) may be carved from these RAID arrays.

In selected embodiments, the storage controller 200 includes one or more servers 206. The storage controller 200 may also include host adapters 208 and device adapters 210 to connect the storage controller 200 to host devices 106 and storage drives 204, respectively. During normal operation (when both servers 206 are operational), the servers 206 may manage I/O to different logical subsystems (LSSs) within the enterprise storage system 110a. For example, in certain configurations, a first server 206a may handle I/O to even LSSs, while a second server 206b may handle I/O to odd LSSs. These servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 includes one or more processors 212 and memory 214. The memory 214 may include volatile memory (e.g., RAM) as well as non-volatile memory (e.g., ROM, EPROM, EEPROM, flash memory, local disk drives, local solid state drives etc.). The volatile and non-volatile memory may, in certain embodiments, store software modules that run on the processor(s) 212 and are used to access data in the storage drives 204. These software modules may manage all read and write requests to logical volumes 302 in the storage drives 204.

In selected embodiments, the memory 214 includes a cache 218, such as a DRAM cache 218. Whenever a host 106 (e.g., an open system or mainframe server 106) performs a read operation, the server 206 that performs the read may fetch data from the storages drives 204 and save it in its cache 218 in the event it is required again. If the data is requested again by a host 106, the server 206 may fetch the data from the cache 218 instead of fetching it from the storage drives 204, saving both time and resources. Similarly, when a host 106 performs a write, the server 106 that receives the write request may store the write in its cache 218, and destage the write to the storage drives 204 at a later time. When a write is stored in a cache 218, the write may also be stored in non-volatile storage (NVS) 220 of the opposite server 206 so that the write can be recovered by the opposite server 206 in the event the first server 206 fails.

One example of a storage system 110a having an architecture similar to that illustrated in FIG. 2 is the IBM DS8000® enterprise storage system. The DS8000® is a high-performance, high-capacity storage controller providing disk and solid-state storage that is designed to support continuous operations. Nevertheless, the systems and methods disclosed herein are not limited to the IBM DS8000® enterprise storage system, but may be implemented in any comparable or analogous storage system or group of storage systems, regardless of the manufacturer, product name, or components or component names associated with the system. Any storage system that could benefit from one or more embodiments of the invention is deemed to fall within the scope of the invention. Thus, the IBM DS8000® is presented only by way of example and is not intended to be limiting.

Referring to FIG. 3, in certain embodiments the host systems 106 and storage systems 110a described in FIGS. 1 and 2 may be used in a data replication environment, such as an asynchronous data replication environment 300. As previously mentioned, in asynchronous data replication environments such as z/OS Global Mirror (also referred to hereinafter as "XRC") and Global Mirror, data is mirrored from a primary storage system 304a to a secondary storage system 304b to maintain two consistent copies of the data. The primary and secondary storage systems 304a, 304b may each be a storage system 110a such as that illustrated in FIG. 2. The primary and secondary storage systems 304a, 304b may be located at different sites, perhaps hundreds or even thousands of miles away from one another. In the event an outage occurs at the primary site, host I/O may be redirected to the secondary storage system 304b, thereby enabling continuous operations. When the outage is corrected or repaired at the primary site, host I/O may be redirected back to the primary storage system 304a.

FIG. 3 is a high-level block diagram showing an asynchronous data replication environment such as XRC. Using XRC, updated data elements (e.g., tracks) are written to cache 218 of the primary storage system 304a. The updated data elements are recorded in an out-of-sync bitmap (i.e., OOS) to indicate that they need to be mirrored to the secondary storage system 304b. Data elements that are written to the primary cache 218 may be destaged to backend storage drives 204 (i.e., volumes 302a) residing on the primary storage system 304a, and eventually demoted from the primary cache 218. The destage and demotion processes are independent from the asynchronous mirroring process. In certain cases, the primary storage system 304a may destage and demote a data element before the asynchronous mirroring takes place. In such cases, the data element may need to be re-staged to the primary cache 218 so it can be mirrored to the secondary storage system 304b.

In other cases, the data element may be asynchronously mirrored to the secondary storage system 304b before the data element is destaged and demoted from the primary cache 218. This scenario is preferred, since it only requires mirroring modified portions (e.g., sectors) of the updated data element to the secondary storage system 304b, whereas a scenario that re-stages the data element to the primary cache 218 not only requires moving the data element from the backend storage drives 204 to the primary cache 218, but also requires mirroring the entire data element (e.g., track) to the secondary storage system 304b. Thus, re-staging and mirroring an unmirrored data element may be significantly less efficient than mirroring the data element prior to its destage and/or demotion.

Figure 4:
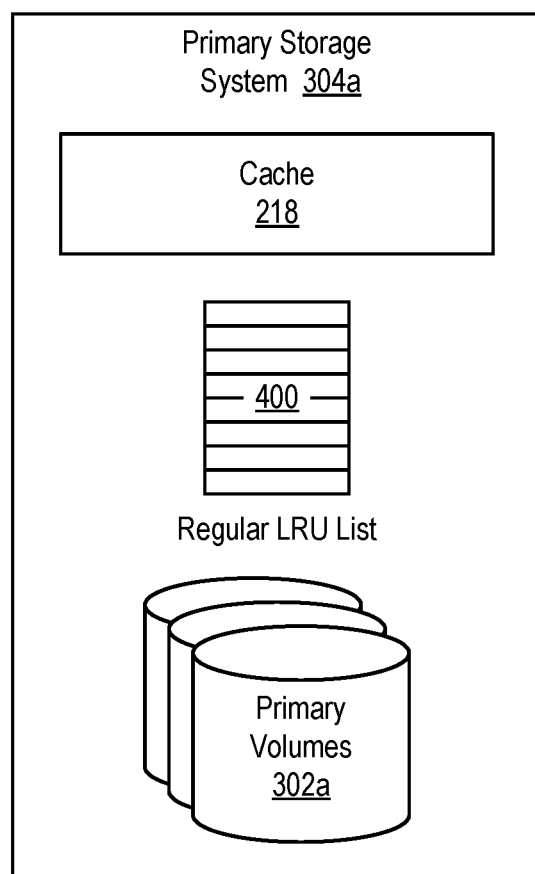
FIG. 4 is a high-level block diagram showing a regular LRU list that may be maintained for cache in a primary storage system.

Referring to FIG. 4, in certain embodiments, functionality may be provided within the primary storage system 304a to improve asynchronous data replication between a primary storage system 304a and a secondary storage system 304b. More specifically, the functionality may retain more unmirrored data elements in the primary cache 218 so that the unmirrored data elements do not have to be retrieved from backend storage drives 204 prior to being mirrored to the secondary storage system 304b. For the purposes of this disclosure, "unmirrored data elements" are defined to include data elements that need to be mirrored, but that have not yet been mirrored, from the primary storage system 304a to the secondary storage system 304b. For example, data elements that belong to mirroring relationships and have been modified on the primary storage system 304a, but have not yet been mirrored to the secondary storage system 304b, may be considered "unmirrored data elements."

As shown in FIG. 4, in certain embodiments, in order to improve asynchronous mirroring performance between a primary storage system 304a and a secondary storage system 304b, a regular LRU list 400 may be maintained for a cache 218 residing on the primary storage system 304a. This regular LRU list 400 may designate an order in which data elements are demoted from the primary cache 218. The primary cache 218 may contain unmirrored data elements as well as data elements that do not need to be mirrored from the primary storage system 304a to the secondary storage system 304b (e.g., unmodified data elements or data elements that do not participate in mirroring relationships with the secondary storage system 304b).

Figure 5:
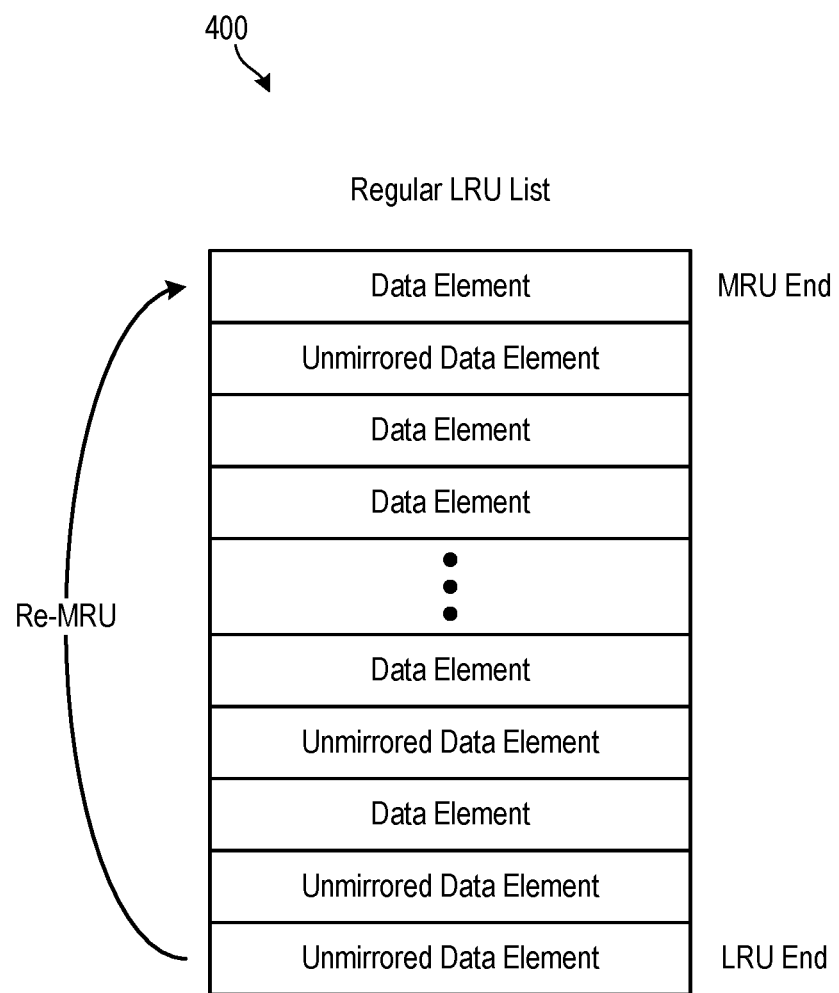
FIG. 5 is a high-level block diagram showing how the regular LRU list of FIG. 4 may be used to improve asynchronous data replication performance.

Referring to FIG. 5, while continuing to refer generally to FIG. 4, as data elements are demoted from the regular LRU list 400, systems and methods in accordance with the invention may determine whether the data elements at the LRU end of the regular LRU list 400 are unmirrored data elements. If so, the systems and methods may move the unmirrored data elements back to a most recently used (MRU) end of the regular LRU list 400 (hereinafter referred to as "re-MRUing") instead of demoting them, thereby providing the unmirrored data elements additional time in the primary cache 218 before they are demoted. This, in turn, provides additional time to asynchronously mirror the unmirrored data elements from the primary cache 218 to the secondary storage system 304b without needing to restage the unmirrored data elements from backend storage drives 204.

In certain embodiments, unmirrored data elements may only be moved to the MRU end of the regular LRU list 400 a certain number of times before they are demoted from the cache 218. For example, in one embodiment, unmirrored data elements may only be re-inserted at the MRU end of the regular LRU list 400 a single time, not counting times the unmirrored data elements are added to the MRU end as a result of other accesses (e.g., reads and writes) not related to mirroring. Unmirrored data elements may be flagged to indicate that they have been re-added to the MRU end so that they are not re-added again. If an unmirrored data element is encountered at the LRU end of the regular LRU list 400 that has already been previously re-MRUed, the unmirrored data element may be demoted like other data elements.

Figure 6:
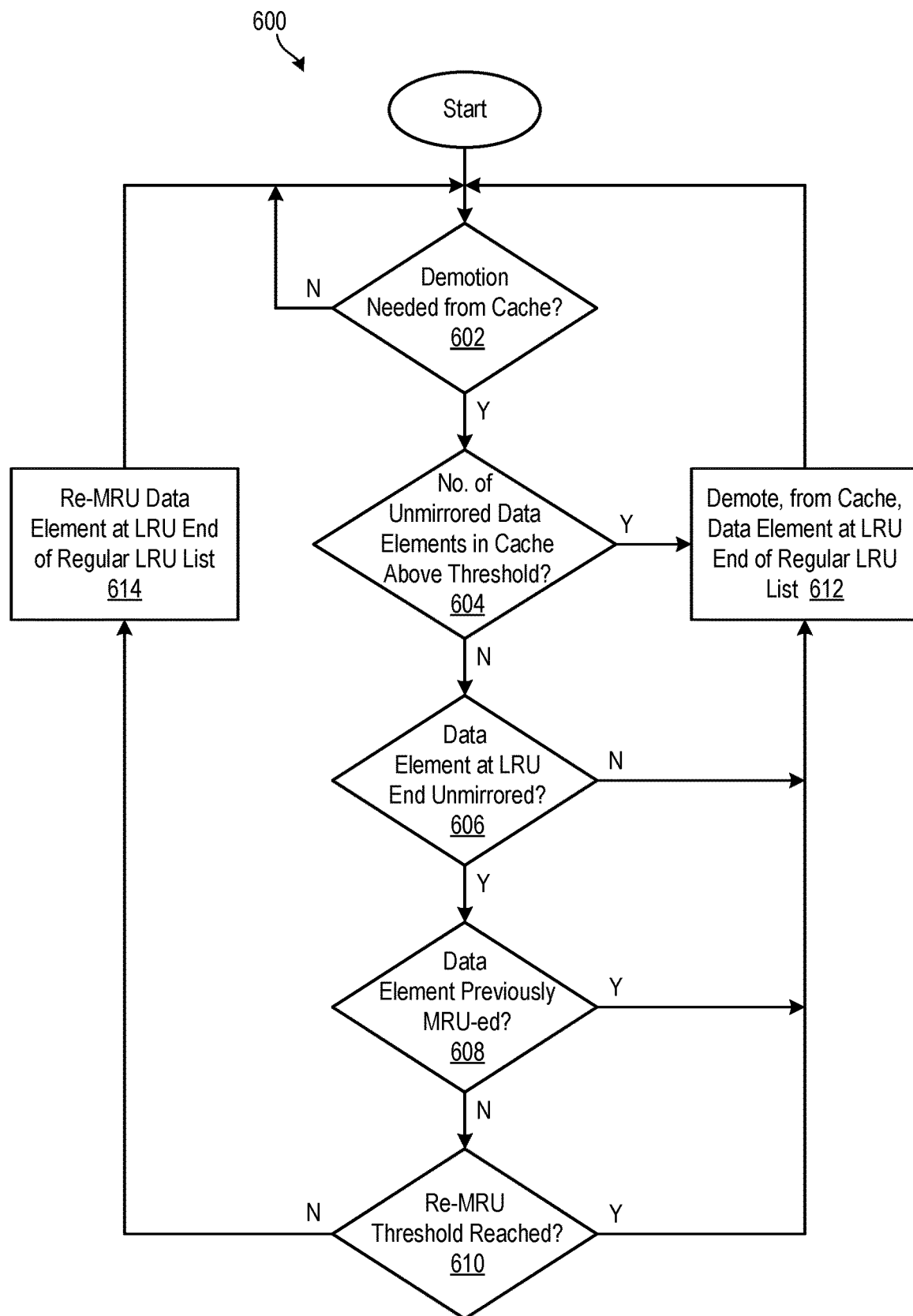
FIG. 6 is a flow diagram showing one embodiment of a method for demoting a data element from cache in the environment illustrated in FIGS. 4 and 5.

FIG. 6 shows one embodiment of a method 600 for demoting a data element from the primary cache 218 using the techniques illustrated and described in association with FIGS. 4 and 5. As shown, the method 600 determines 602 whether a demotion is needed to clear space in the cache 218. If so, the method 600 determines 604 whether a number of unmirrored data elements in the cache 218 is above a threshold.

In general, if unmirrored data elements occupy more than a designated amount (e.g., twenty five percent) of the cache 218, unmirrored data elements may be demoted as opposed to re-MRUed if they are encountered at the LRU end of the regular LRU list 400. On the other hand, if unmirrored data elements occupy less than the threshold, the unmirrored data elements may be re-MRUed if not previously re-MRUed. Thus, at step 604, the method 600 may branch in one of two different directions depending on whether a number of unmirrored data elements in the cache 218 is above or below a designated threshold.

If, at step 604, a number of unmirrored data elements in the cache 218 is above the designated threshold, the method 600 demotes 612, from the cache 218, the data element at the LRU end of the regular LRU list 400, regardless of whether the data element is an unmirrored data element. If, on the other hand, a number of unmirrored data elements in the cache 218 is at or below the threshold, the method 600 determines 606 whether the data element at the LRU end of the regular LRU list 400 is an unmirrored data element. If not, the method 600 demotes 612 the data element.

If, at step 606, the data element at the LRU end of the regular LRU list 400 is an unmirrored data element, the method 600 determines 608 whether the unmirrored data element has been previously re-MRUed. If so, the method 600 demotes 612 the unmirrored data element from the cache 218. If the unmirrored data element has not been previously re-MRUed, the method 600 determines 610 whether a re-MRU threshold has been reached. For example, if a re-MRU threshold is five hundred and a number of unmirrored data elements that have been re-MRUed during a cache demotion process has exceeded the re-MRU threshold, an unmirrored data element may be demoted 612 from the cache 218 regardless of its unmirrored status. If the re-MRU threshold has not been reached, the method 600 re-MRUes the unmirrored data element by reinserting it at the MRU end of the regular LRU list 400.

Figure 7:
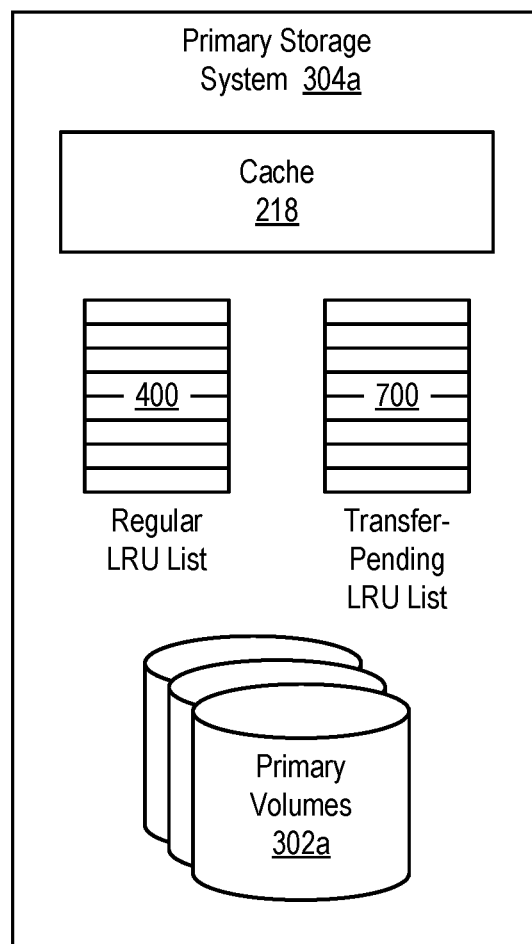
FIG. 7 is a high-level block diagram showing a regular LRU list and a transfer-pending LRU list that may be maintained for cache in a primary storage system.

FIG. 7 shows an alternative embodiment of an environment that may be used to improve asynchronous data replication between a primary storage system 304*a* and a secondary storage system 304*b*. As shown, instead of using just a regular LRU list 400, the illustrated environment includes a regular LRU list 400 and a transfer-pending LRU list 700 that are used in association with a cache 218. The regular LRU list 400 designates an order in which data elements are demoted from the cache 218. The transfer-pending LRU list 700, by contrast, is a list of unmirrored data elements that will be demoted from the cache 218 after they have been transferred to the secondary storage system 304*b*.

Figure 8:
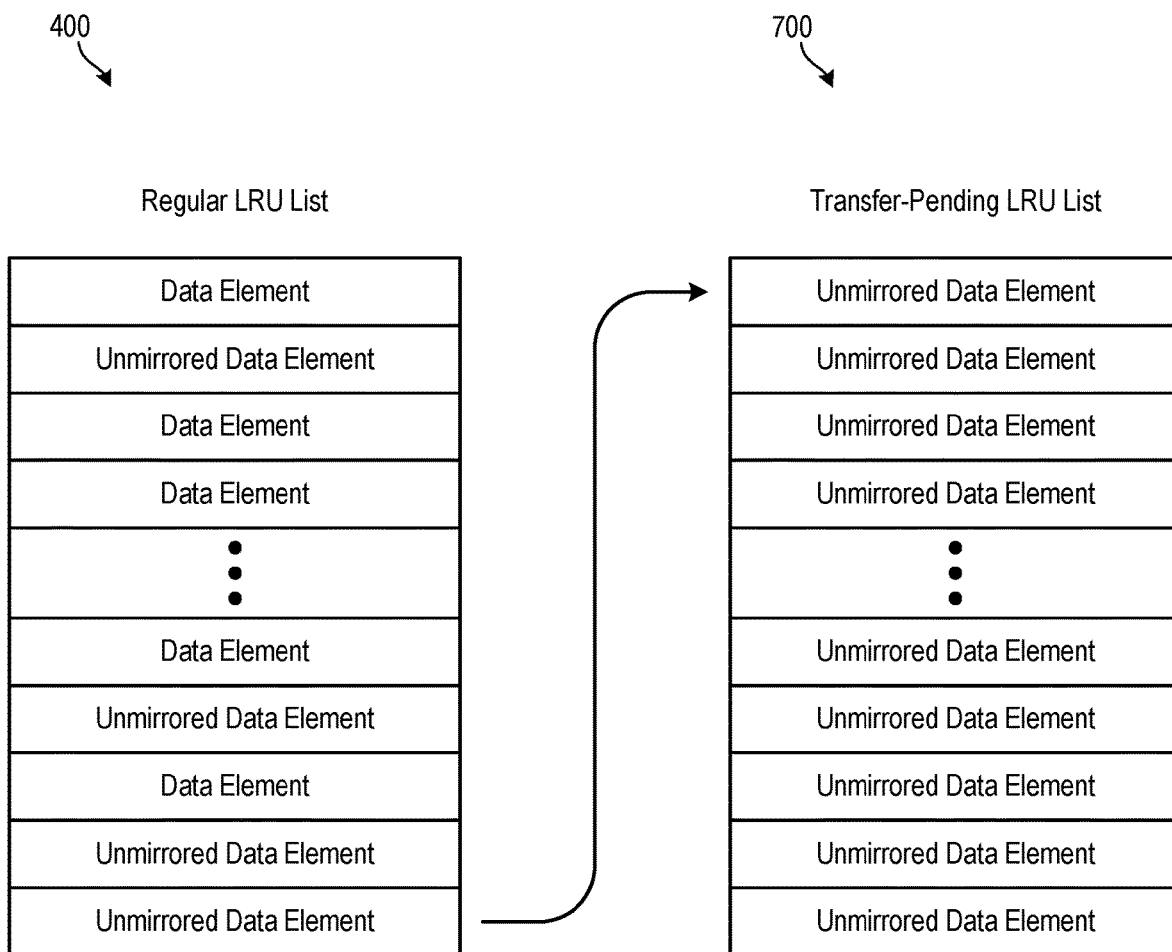
FIG. 8 is a high-level block diagram showing how the regular LRU list and transfer-pending LRU list of FIG. 7 may be used to improve asynchronous data replication performance.

Referring to FIG. 8, while continuing to refer generally to FIG. 7, when space needs to be cleared in the cache 218, a data element may be analyzed at an LRU end of the regular LRU list 400. If the data element is an unmirrored data element, the unmirrored data element may be moved from the regular LRU list 400 to the transfer-pending LRU list 700 where it may reside until its mirrored to the secondary storage system 304*b*. On the other hand, if the data element at the LRU end of the regular LRU list 400 is not an unmirrored data element, the data element may be demoted to clear space in the cache 218.

When unmirrored data elements in the transfer-pending LRU list 700 are transferred from the cache 218 to the secondary storage system 304*b*, the unmirrored data elements may be removed from the transfer-pending LRU list 700 and demoted from the cache 218. By contrast, if an unmirrored data element in the regular LRU list 400 is transferred to the secondary storage system 304*b*, the data element may remain in its current position in the regular LRU list 400 and be demoted in due course. If a cache hit (other than a mirror transfer to the secondary storage system 304*b*) occurs to an unmirrored data element in the transfer-pending LRU list 700 or the regular LRU list 400, the data element may be removed from its current positions on the transfer-pending LRU list 700 or regular LRU list 400 and moved to the MRU end of the regular LRU list 400.

Figure 9:
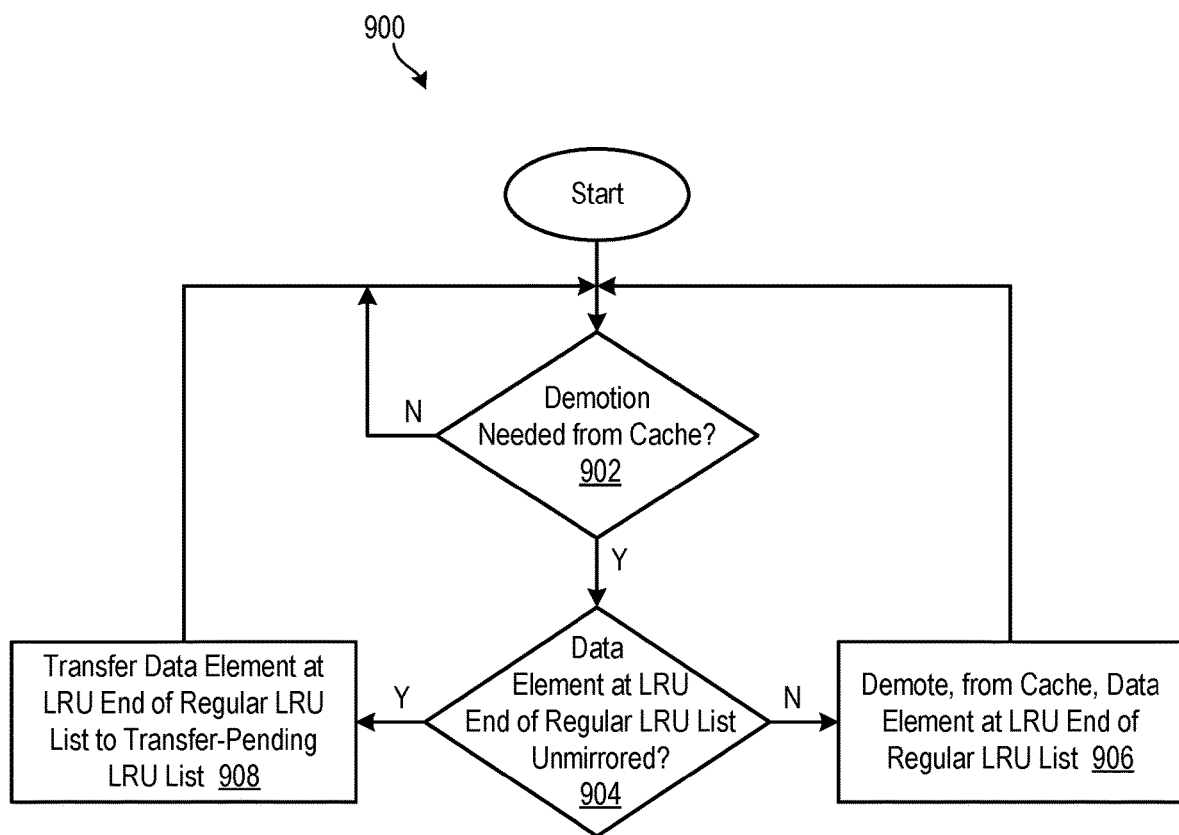
FIG. 9 is a flow diagram showing one embodiment of a method for demoting a data element from cache in the environment illustrated in FIGS. 7 and 8.

FIG. 9 shows one embodiment of a method 900 that may be executed when space needs to be cleared in the cache 218 of the environment illustrated in FIGS. 7 and 8. As shown in FIG. 9, the method 900 initially determines 902 whether a demotion is needed to clear space in the cache 218. If so, the method 900 determines 904 whether a data element at the LRU end of the regular LRU list 400 is an unmirrored data element. If not, the method 900 demotes 906, from the cache 218, the data element at the LRU end of the regular LRU list 400. If the data element is an unmirrored data element, the method 900 transfers 908 the data element to the MRU end of the transfer-pending LRU list 700.

Figure 10:
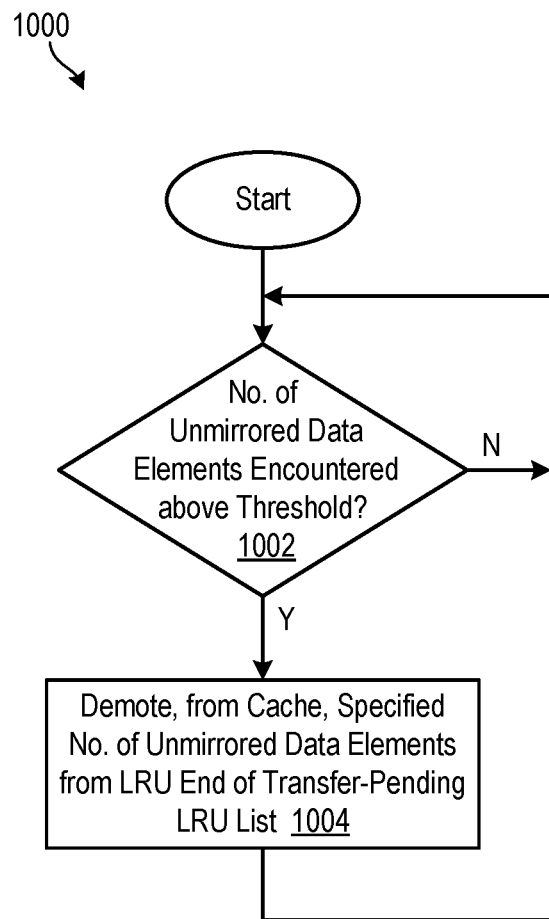
FIG. 10 is a flow diagram showing one embodiment of a method for demoting unmirrored data elements from cache in the environment illustrated in FIGS. 7 and 8.

When clearing space in the cache 218 using the regular LRU list 400, if too many unmirrored data elements are encountered at the LRU end of the regular LRU list 400, unmirrored data elements may be demoted from the cache 218 regardless of their unmirrored status. FIG. 10 shows one embodiment of a method 1000 that may be executed in such a situation. As shown in FIG. 10, if, at step 1002, a specified number of unmirrored data elements are encountered at the LRU end of the regular LRU list 400 when demoting data elements from the cache 218, the method 1000 demotes 1004, from the cache 218, a specified number of unmirrored data elements from the LRU end of the transfer-pending LRU list 700. As an example, if five hundred unmirrored data elements are encountered at the LRU end of the regular LRU list 400 during a cache demotion process, the method 1000 demotes 1004, from the cache 218, five hundred unmirrored data elements from the LRU end of the transfer-pending LRU list 700. These numbers are presented by way of example and not limitation.

In an alternative embodiment, step 1002 of FIG. 10 may determine whether a size of the transfer-pending LRU list 700 exceeds a threshold. If so, the method 1000 may demote 1004, from the cache 218, a specified number of unmirrored data elements from the LRU end of the transfer-pending LRU list 700. Alternatively, if a size of the transfer-pending LRU list 700 exceeds a threshold, the method 1000 may attempt to transfer a designated number of data elements from the cache 218 to the secondary storage system 304*b* and then demote the data elements from the cache 218. If transfer is not possible due to bandwidth or link issues, the method 1000 may simply demote 1004 a specified number of unmirrored data elements from the LRU end of the transfer-pending LRU list 700, or demote data elements from the LRU end of the transfer-pending LRU list 700 until the size of the transfer-pending LRU list 700 falls below the threshold.

Figure 11:
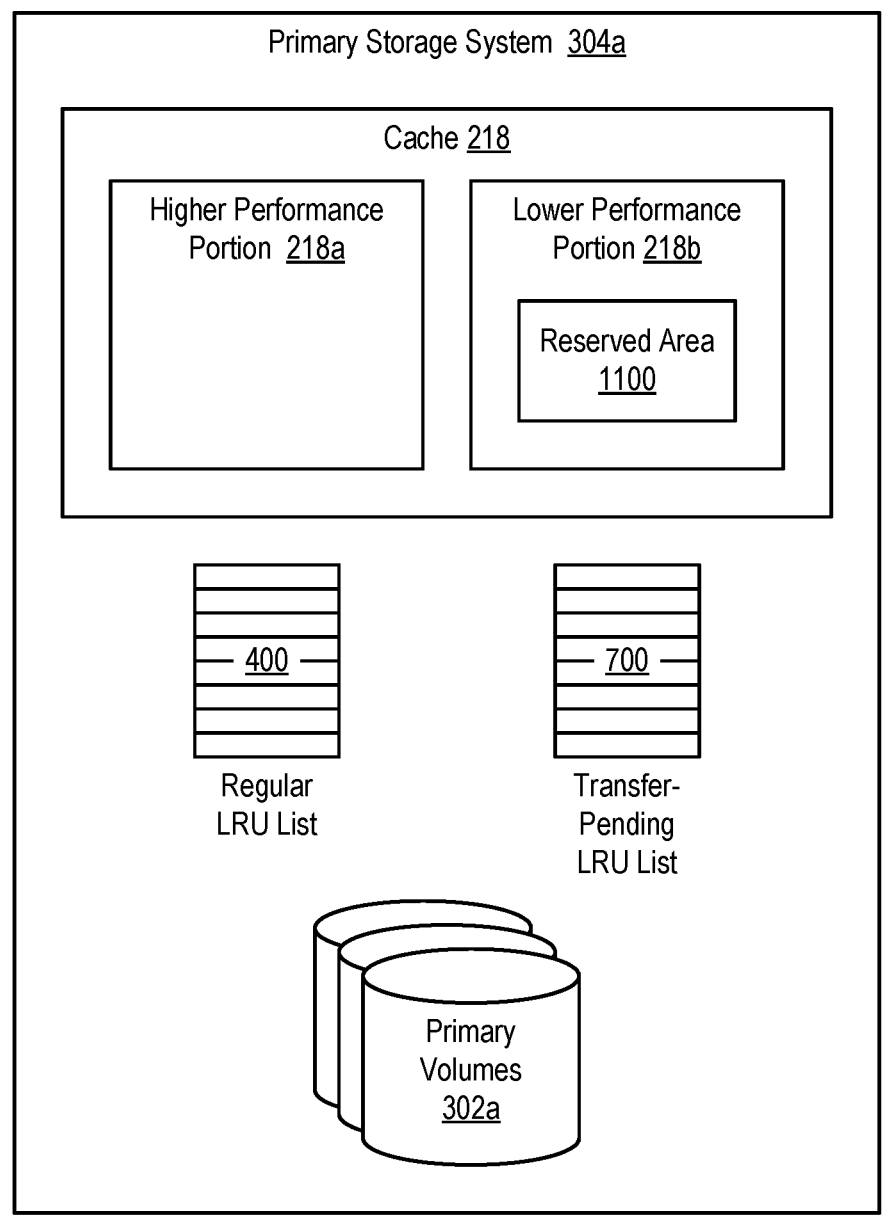
FIG. 11 is a high-level block diagram showing a regular LRU list, transfer-pending LRU list, and reserved area that may be used to improve asynchronous data replication performance.

FIG. 11 shows yet another embodiment of an environment that may be used to improve asynchronous data replication between a primary storage system 304*a* and a secondary storage system 304*b*. In the illustrated embodiment, the cache 218 is a heterogeneous cache 218 comprising a higher performance portion 218*a* and a lower performance portion 218*b*. In one embodiment, the higher performance portion 218*a* is made up of DRAM memory and the lower performance portion 218*b* is made up of flash memory such as storage class memory (SCM). Within the lower performance portion 218*b*, an area 1100 may be reserved for unmirrored data elements that are waiting to be transferred to the secondary storage system 304*b*. A regular LRU list 400 may be maintained for the higher performance portion 218*a* and may indicate an order in which data elements are demoted from the higher performance portion 218*a*. A transfer-pending LRU list 700 may be maintained for the reserved area 1100 and may indicate an order in which unmirrored data elements are demoted from the reserved area 1100 when space needs to be cleared therein.

Figure 12:
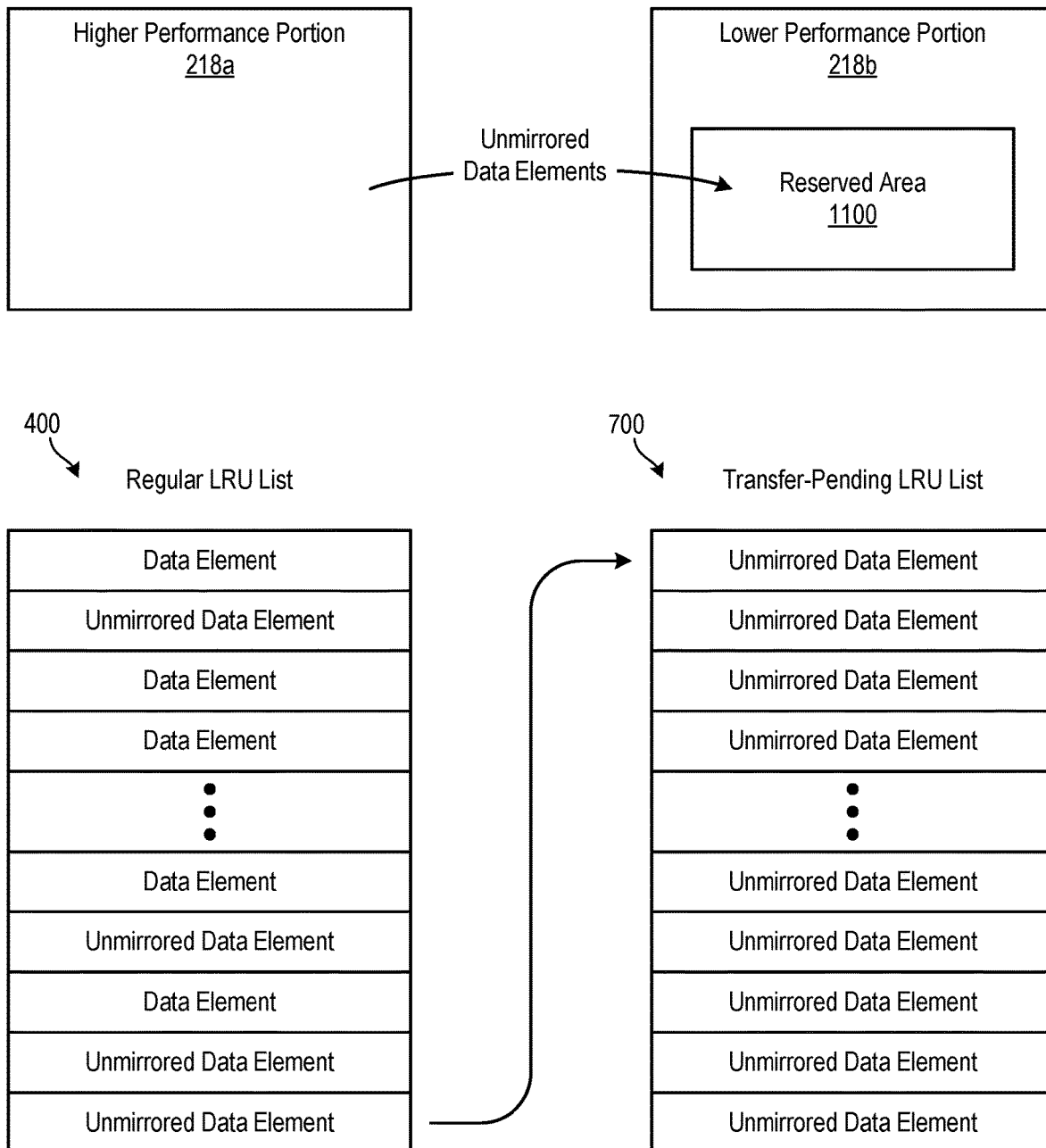
FIG. 12 is a high-level block diagram showing how the regular LRU list, transfer-pending LRU list, and reserved area of FIG. 11 may be used to improve asynchronous data replication performance.

Referring to FIG. 12, while continuing to refer generally to FIG. 11, when space needs to be cleared in the higher performance portion 218*a*, a data element at the LRU end of the regular LRU list 400 is checked to determine if it is an unmirrored data element. If the data element is an unmirrored data element, the data element is transferred from the higher performance portion 218*a* to the reserved area 1100 within the lower performance portion 218*b*. The unmirrored data element may also be removed from a directory (hash table) associated with the higher performance portion 218*a* and added to a directory associated with the reserved area 1100. Furthermore, the unmirrored data element may be removed from the LRU end of the regular LRU list 400 and added to the MRU end of the transfer-pending LRU list 700.

Figure 13:
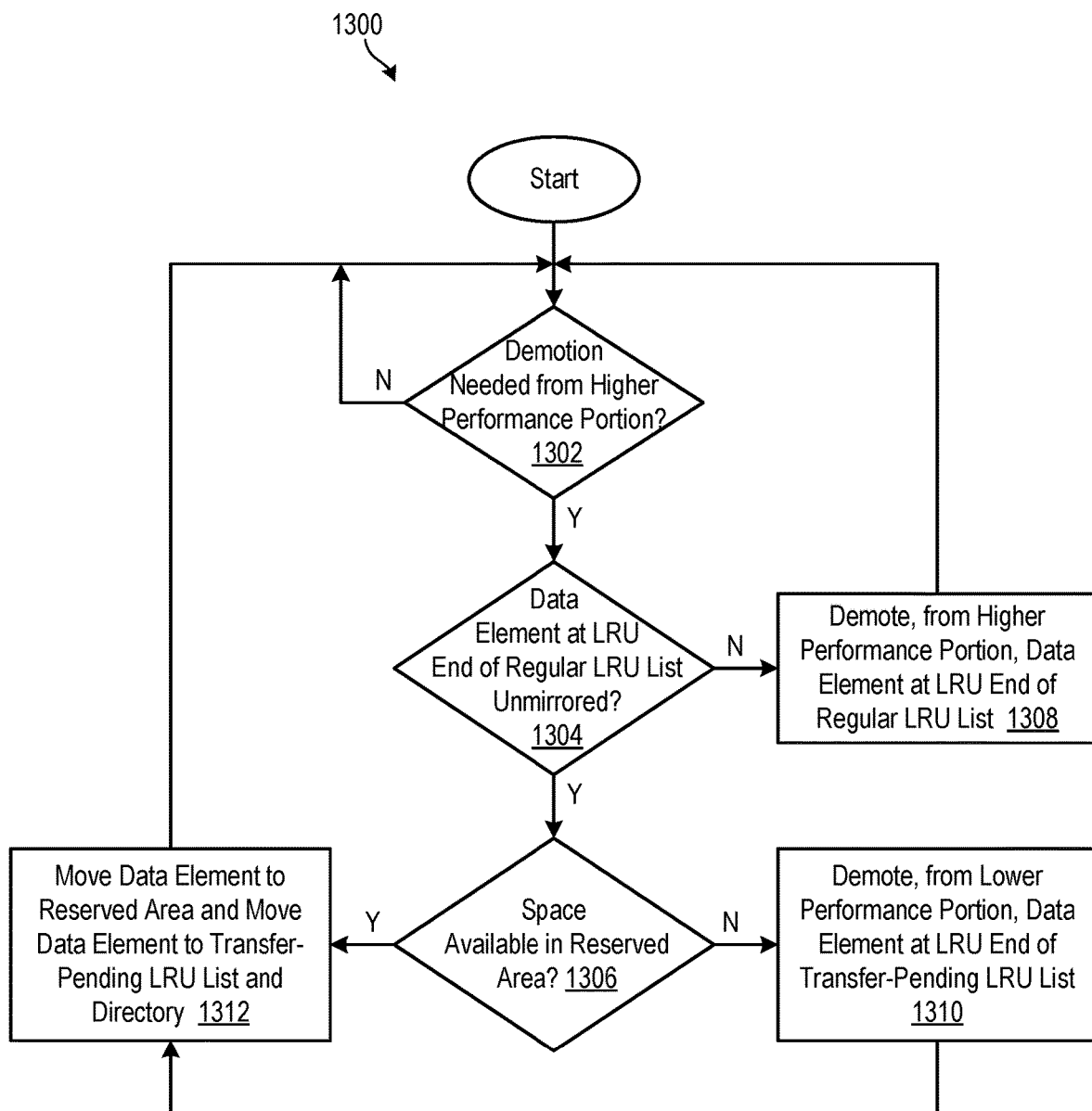
FIG. 13 is a flow diagram showing one embodiment of a method for demoting a data element from the higher performance portion in the environment illustrated in FIGS. 11 and 12.

Referring to FIG. 13, when space needs to be cleared in the higher performance portion 218*a*, a method 1300 may be used to demote data elements from the higher performance portion 218*a*. As shown, the method 1300 initially determines 1302 whether a demotion is needed from the higher performance portion 218*a*. If so, the method 1300 determines 1304 whether the data element at the LRU end of the regular LRU list 400 is an unmirrored data element. In not, the method 1300 demotes 1308, from the higher performance portion 218*a*, the data element that is at the LRU end of the regular LRU list 400.

If, at step 1304, the data element at the LRU end of the regular LRU list 400 is an unmirrored data element, the method 1300 determines 1306 whether space is available in the reserved area 1100. If not, the method 1300 demotes 1310, from the reserved area 1100, the unmirrored data element that is at the LRU end of the transfer-pending LRU list 700. This will clear space in the reserved area 1100 to receive a new unmirrored data element. The method 1300 then moves 1312 the unmirrored data element from the higher performance portion 218a to the reserved area 1100, moves 1312 the unmirrored data element from the LRU end of the regular LRU list 400 to the MRU end of the transfer-pending LRU list 700, and moves the unmirrored data element from the directory associated with the higher performance portion 218a to the directory associated with the reserved area 1100. If, at step 1306, space is already available in the reserved area 1100, the method 1300 performs each of the steps 1312 without clearing space in the reserved area 1100.

Figure 14:
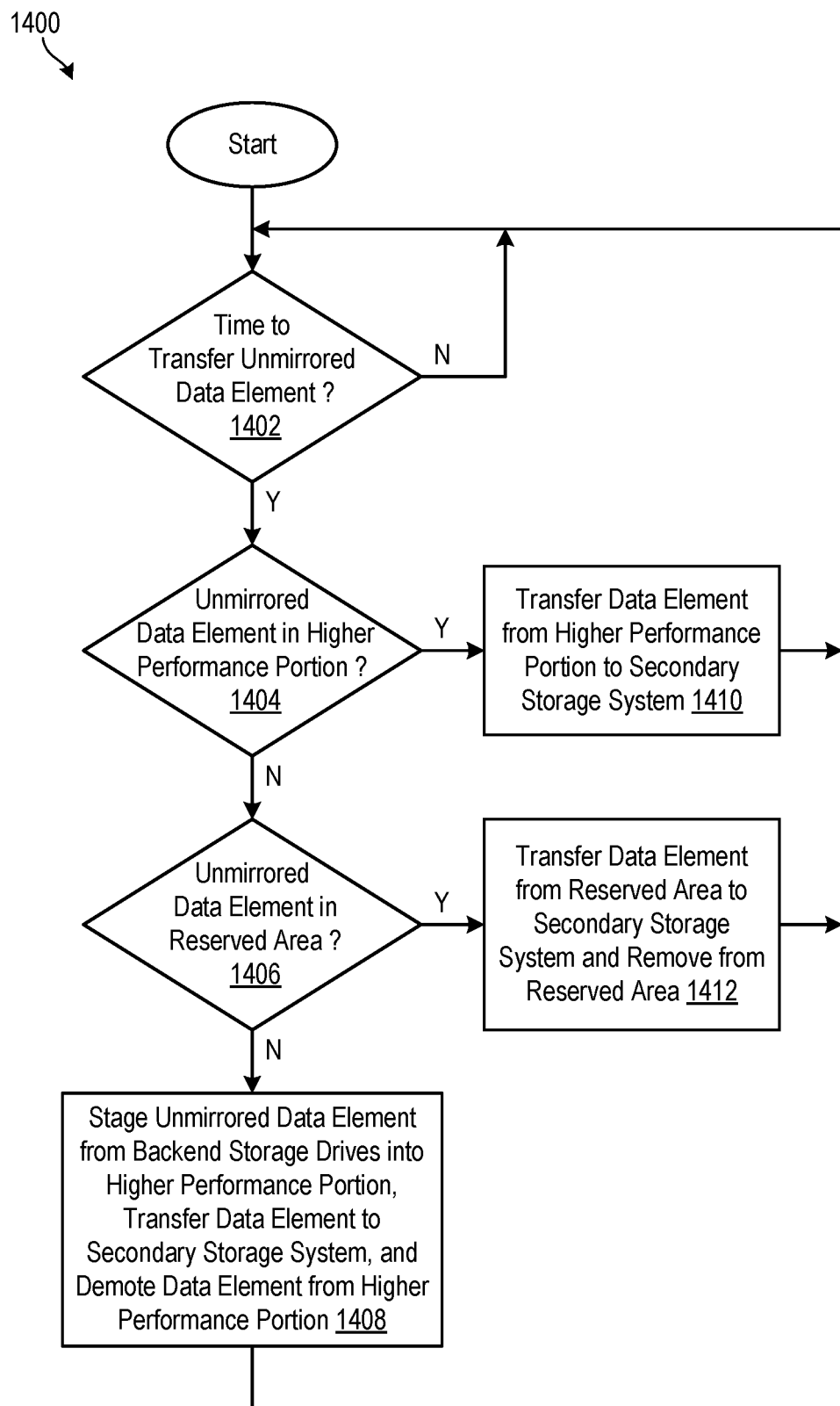
FIG. 14 is a flow diagram showing one embodiment of a method for transferring an unmirrored data element from the primary storage system to the secondary storage system in the environment illustrated in FIGS. 11 and 12.

Referring to FIG. 14, when asynchronous data replication functionality mirrors an unmirrored data element to the secondary storage system 304b, a method 1400 may be performed to locate and mirror the unmirrored data element. As shown, the method 1400 determines 1402 whether it is time to mirror an unmirrored data element to the secondary storage system 304b. If so, the method 1400 determines 1404 whether the unmirrored data element is in the higher performance portion 218a. If so, the method 1400 transfers 1410 the unmirrored data element from the higher performance portion 218a to the secondary storage system 304b.

If the unmirrored data element is not in the higher performance portion 218a, the method 1400 determines 1406 whether the unmirrored data element is in the reserved area 1100. If so, the method 1400 transfers 1412 the unmirrored data element from the reserved area 1100 to the secondary storage system 304b and removes the unmirrored data element from the reserved area 1100 (which may include removing the unmirrored data element from the transfer-pending LRU list 700 and the directory associated with the reserved area 1100). If the unmirrored data element is not in the higher performance portion 218a or the reserved area 1100, the method 1400 stages 1408 the unmirrored data element from backend storage drives 204 to the higher performance portion 218a, transfers 1408 the unmirrored data element from the higher performance portion 218a to the secondary storage system 304b, and then demotes 1408 the data element from the higher performance portion 218a.

The various techniques illustrated in FIGS. 4 through 14 are advantageous in that they retain, as much as possible, unmirrored data elements in a cache 218 until the unmirrored data elements can be mirrored from the primary storage system 304a to the secondary storage system 304b. This reduces overhead associated with staging unmirrored data elements from backend storage drives 204 to the cache 218. This also increases efficiency in that mirroring directly from the cache 218 to the secondary storage system 304b only requires mirroring modified portions of the data elements (e.g., modified sectors of tracks) to the secondary storage system 304b, whereas staging the data element back to the primary cache 218 also requires mirroring the entire data element (e.g., the entire track) to the secondary storage system 304b. The disclosed techniques are also advantageous in that they do not starve other data elements from the cache 218. That is, if unmirrored data elements occupy too much of the cache 218, the disclosed techniques may demote unmirrored data elements from the cache 218 regardless of whether the unmirrored data elements have been mirrored to the secondary storage system 304b. Thus, the disclosed techniques balance LRU order with improved retention of unmirrored data elements.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for improving asynchronous data replication between a primary storage system and a secondary storage system, the method comprising:
monitoring, in a cache of the primary storage system, unmirrored data elements needing to be mirrored, but that have not yet been mirrored, from the primary storage system to the secondary storage system;
maintaining a regular LRU (least recently used) list designating an order in which data elements, including the unmirrored data elements, are demoted from the cache, the regular LRU list comprising an LRU end and an MRU (most recently used) end;
determining whether a data element referenced at the LRU end of the regular LRU list is an unmirrored data element; and
in the event the data element referenced at the LRU end of the regular LRU list is an unmirrored data element, moving a reference to the data element to a transfer-pending LRU list dedicated to unmirrored data elements in the cache, and moving the data element from a higher performance portion of the cache to a lower performance portion of the cache.

2. The method of claim 1, wherein moving the reference to the data element to the transfer-pending LRU list comprises moving the reference to the data element to an MRU (most recently used) end of the transfer-pending LRU list.

3. The method of claim 1, further comprising, in the event an unmirrored data element referenced in the transfer-pending LRU list is successfully mirrored to the secondary storage system, removing the reference to the unmirrored data element from the transfer-pending LRU list and demoting the unmirrored data element from the cache.

4. The method of claim 1, further comprising, in the event an unmirrored data element referenced in the transfer-pending LRU list is accessed in the cache for a reason other than to mirror the unmirrored data element to the secondary storage system, moving the reference to the unmirrored data element to the regular LRU list.

5. The method of claim 4, wherein moving the reference to the unmirrored data element to the regular LRU list comprises moving the reference to the unmirrored data element to an MRU end of the regular LRU list.

6. The method of claim 1, wherein moving the reference to the data element to the transfer-pending LRU list comprises moving the reference to the data element to the transfer-pending LRU list only if a number of unmirrored data elements encountered at the LRU end of the regular LRU list is below a threshold.

7. The method of claim 1, further comprising, in the event a number of unmirrored data elements encountered at the LRU end of the regular LRU list is above a threshold, demoting a designated number of unmirrored data elements referenced in the transfer-pending LRU list from the cache.

8. A computer program product for improving asynchronous data replication between a primary storage system and a secondary storage system, the computer program product comprising a non-transitory computer-readable storage medium having computer-usable program code embodied therein, the computer-usable program code configured to perform the following when executed by at least one processor:
    monitor, in a cache of the primary storage system, unmirrored data elements needing to be mirrored, but that have not yet been mirrored, from the primary storage system to the secondary storage system;
    maintain a regular LRU (least recently used) list designating an order in which data elements, including the unmirrored data elements, are demoted from the cache, the regular LRU list comprising an LRU end and an MRU (most recently used) end;
    determine whether a data element referenced at the LRU end of the regular LRU list is an unmirrored data element; and
    in the event the data element referenced at the LRU end of the regular LRU list is an unmirrored data element, move a reference to the data element to a transfer-pending LRU list dedicated to unmirrored data elements in the cache, and moving the data element from a higher performance portion of the cache to a lower performance portion of the cache.

9. The computer program product of claim 8, wherein moving the reference to the data element to the transfer-pending LRU list comprises moving the reference to the data element to an MRU (most recently used) end of the transfer-pending LRU list.

10. The computer program product of claim 8, wherein the computer-usable program code is further configured to, in the event an unmirrored data element referenced in the transfer-pending LRU list is successfully mirrored to the secondary storage system, remove the reference to the unmirrored data element from the transfer-pending LRU list and demote the unmirrored data element from the cache.

11. The computer program product of claim 8, wherein the computer-usable program code is further configured to, in the event an unmirrored data element referenced in the transfer-pending LRU list is accessed in the cache for a reason other than to mirror the unmirrored data element to the secondary storage system, move the reference to the unmirrored data element to the regular LRU list.

12. The computer program product of claim 11, wherein moving the reference to the unmirrored data element to the regular LRU list comprises moving the reference to the unmirrored data element to an MRU end of the regular LRU list.

13. The computer program product of claim 8, wherein moving the reference to the data element to the transfer-pending LRU list comprises moving the reference to the data element to the transfer-pending LRU list only if a number of unmirrored data elements encountered at the LRU end of the regular LRU list is below a threshold.

14. The computer program product of claim 8, wherein the computer-usable program code is further configured to, in the event a number of unmirrored data elements encountered at the LRU end of the regular LRU list is above a threshold, demote a designated number of unmirrored data elements referenced in the transfer-pending LRU list from the cache.

15. A system for improving asynchronous data replication between a primary storage system and a secondary storage system, the system comprising:
    at least one processor;
    at least one memory device operably coupled to the at least one processor and storing instructions for execution on the at least one processor, the instructions causing the at least one processor to:
        monitor, in a cache of the primary storage system, unmirrored data elements needing to be mirrored, but that have not yet been mirrored, from the primary storage system to the secondary storage system;
        maintain a regular LRU (least recently used) list designating an order in which data elements, including the unmirrored data elements, are demoted from the cache, the regular LRU list comprising an LRU end and an MRU (most recently used) end;
        determine whether a data element referenced at the LRU end of the regular LRU list is an unmirrored data element; and
        in the event the data element referenced at the LRU end of the regular LRU list is an unmirrored data element, move a reference to the data element to a transfer-pending LRU list dedicated to unmirrored data elements in the cache, and moving the data element from a higher performance portion of the cache to a lower performance portion of the cache.

16. The system of claim 15, wherein moving the reference to the data element to the transfer-pending LRU list comprises moving the reference to the data element to an MRU (most recently used) end of the transfer-pending LRU list.

17. The system of claim 15, wherein the instructions further cause the at least one processor to, in the event an unmirrored data element referenced in the transfer-pending LRU list is successfully mirrored to the secondary storage system, remove the reference to the unmirrored data element from the transfer-pending LRU list and demote the unmirrored data element from the cache.

18. The system of claim 15, wherein the instructions further cause the at least one processor to, in the event an unmirrored data element referenced in the transfer-pending LRU list is accessed in the cache for a reason other than to mirror the unmirrored data element to the secondary storage system, move the reference to the unmirrored data element to the regular LRU list.

19. The system of claim 18, wherein moving the reference to the unmirrored data element to the regular LRU list comprises moving the reference to the unmirrored data element to an MRU end of the regular LRU list.

20. The system of claim 15, wherein moving the reference to the data element to the transfer-pending LRU list comprises moving the reference to the data element to the transfer-pending LRU list only if a number of unmirrored data elements encountered at the LRU end of the regular LRU list is below a threshold.

* * * * *